July 4, 1944.  R. VON REPPERT  2,353,095
TYPEWRITING MACHINE
Filed June 25, 1942  7 Sheets-Sheet 1

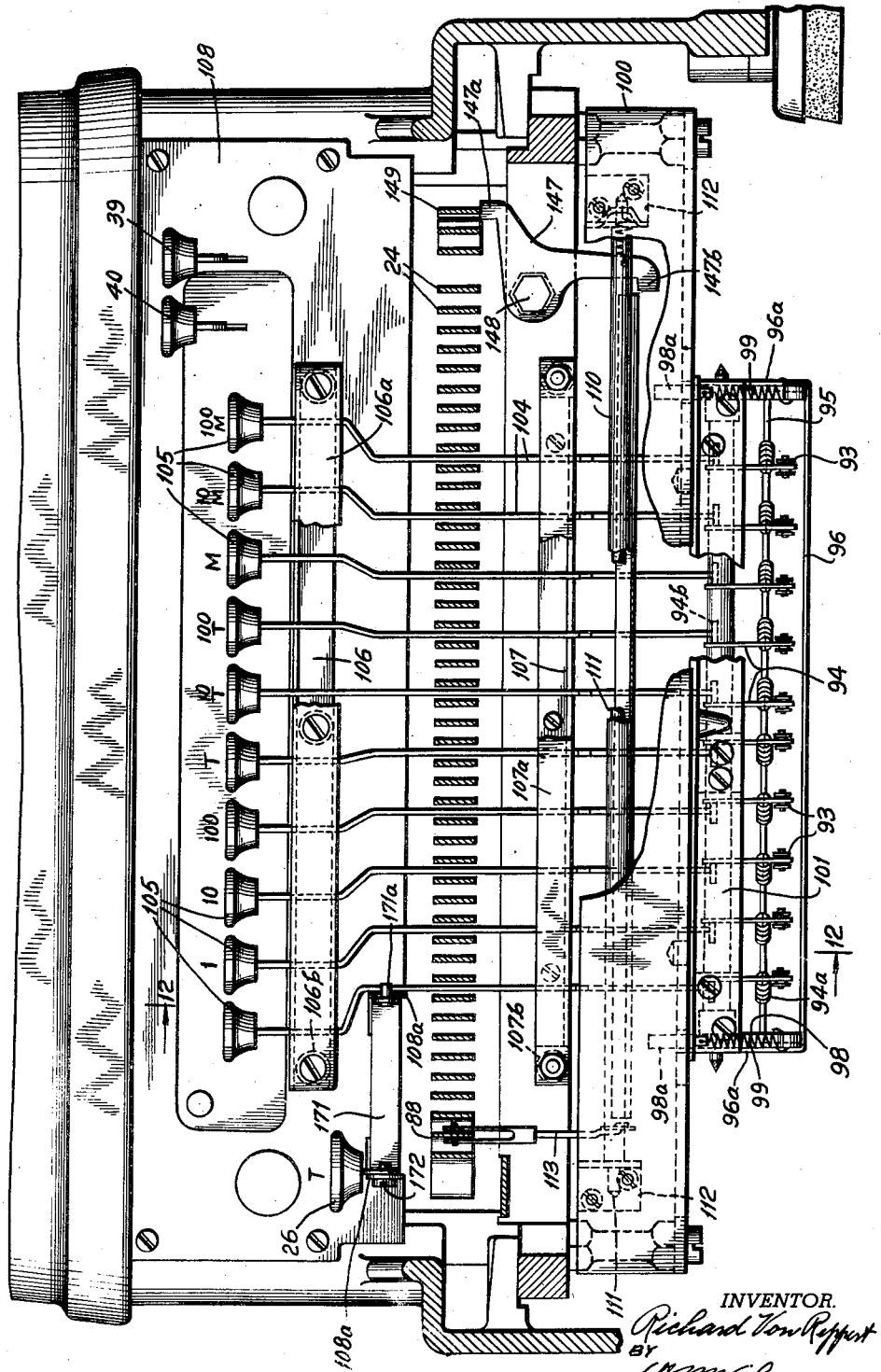

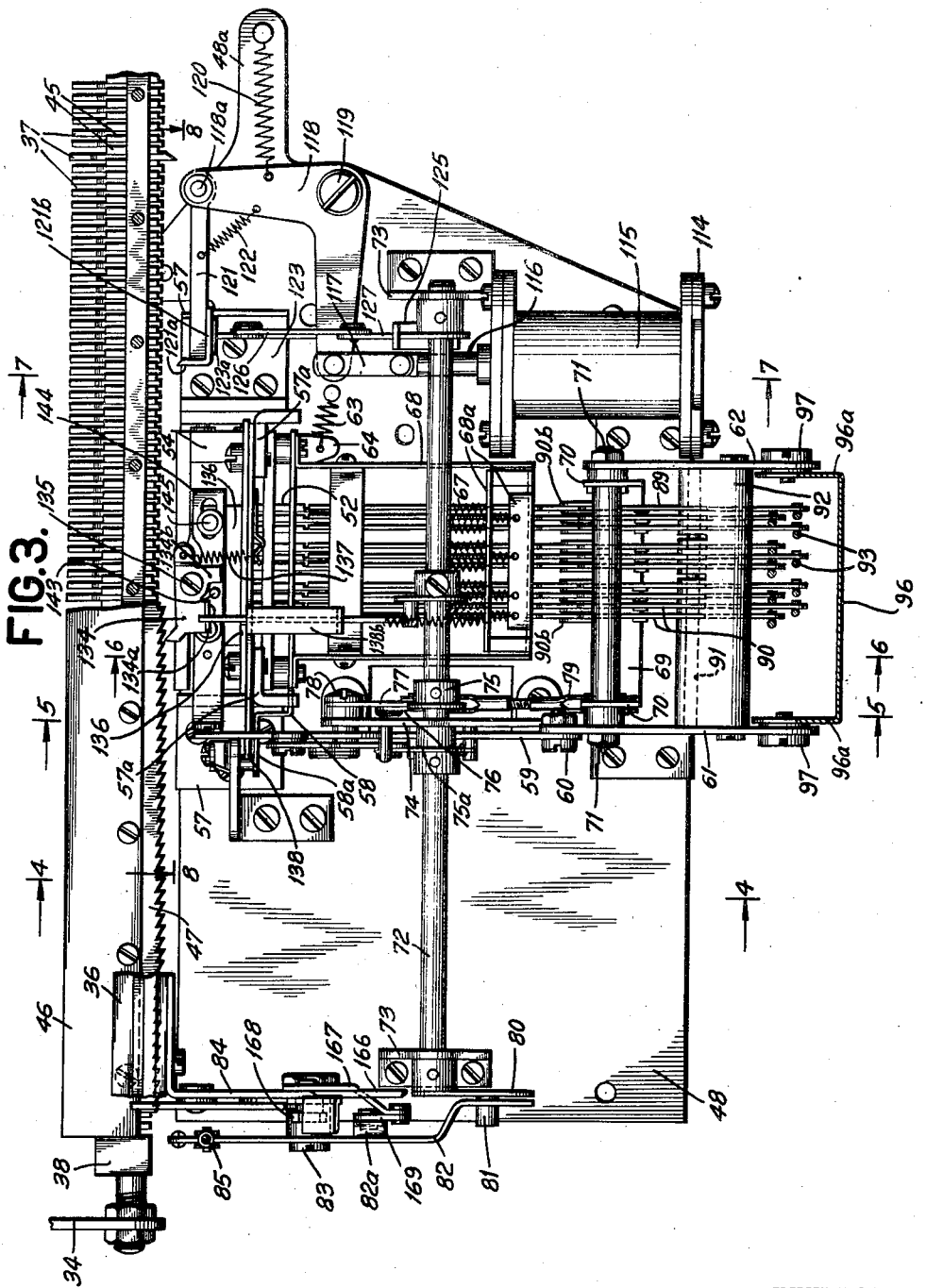

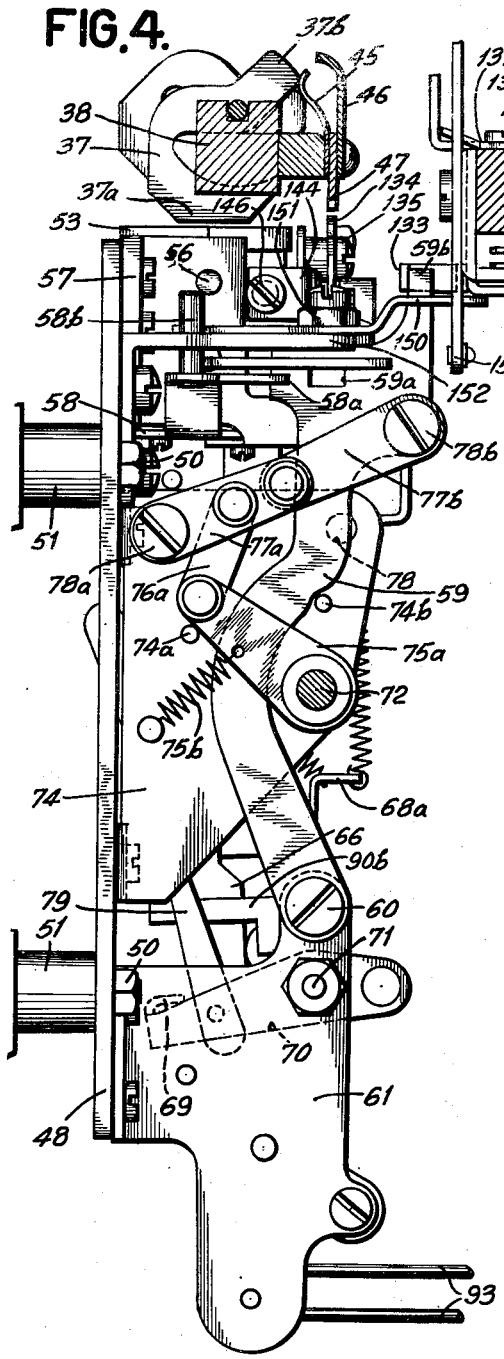

July 4, 1944.  R. VON REPPERT  2,353,095
TYPEWRITING MACHINE
Filed June 25, 1942  7 Sheets-Sheet 5

INVENTOR.
Richard Von Reppert
BY
ATTORNEY.

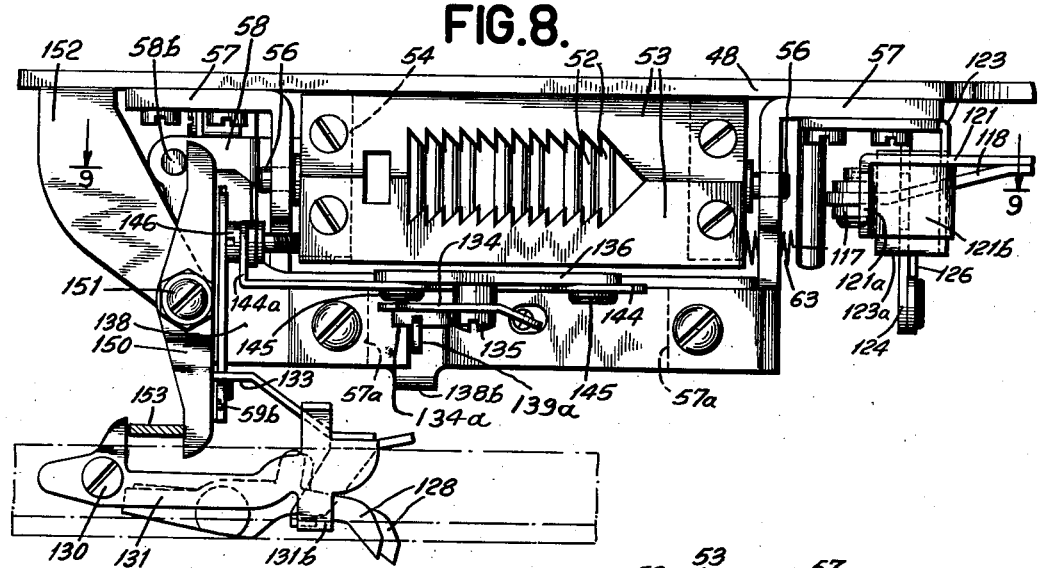
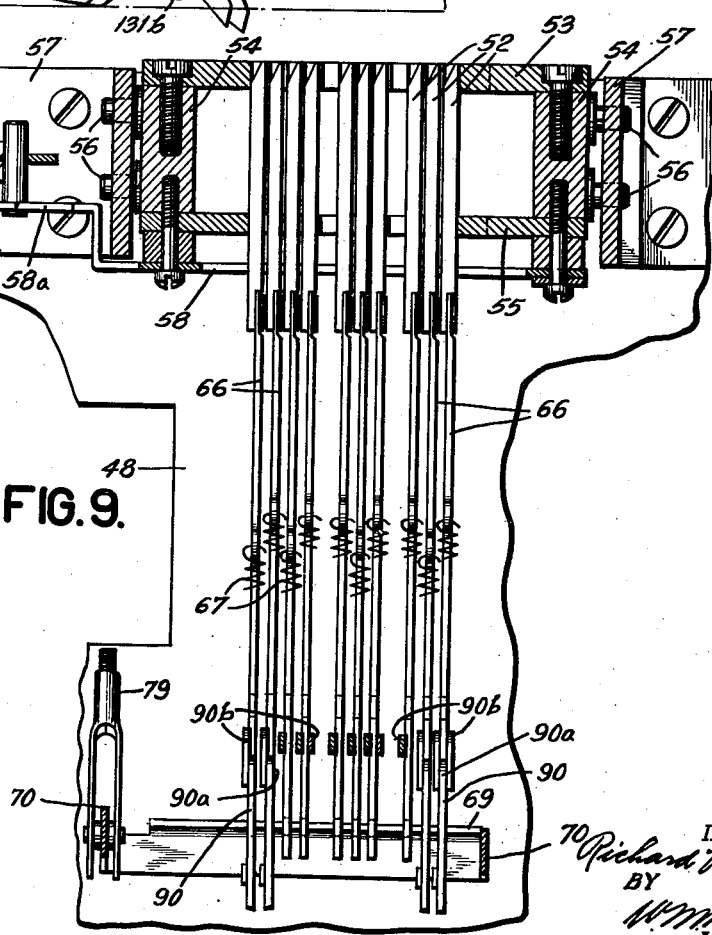

July 4, 1944.  R. VON REPPERT  2,353,095
TYPEWRITING MACHINE
Filed June 25, 1942  7 Sheets-Sheet 7
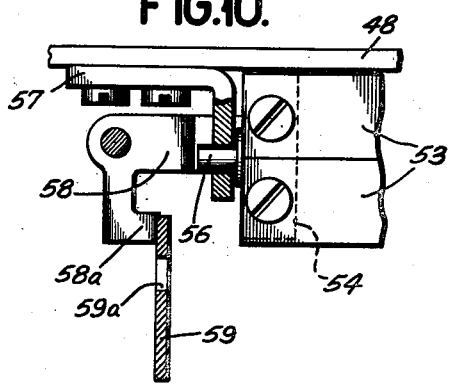
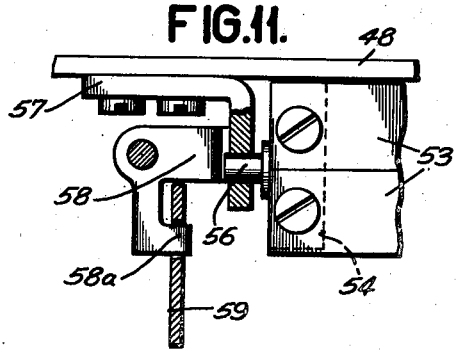
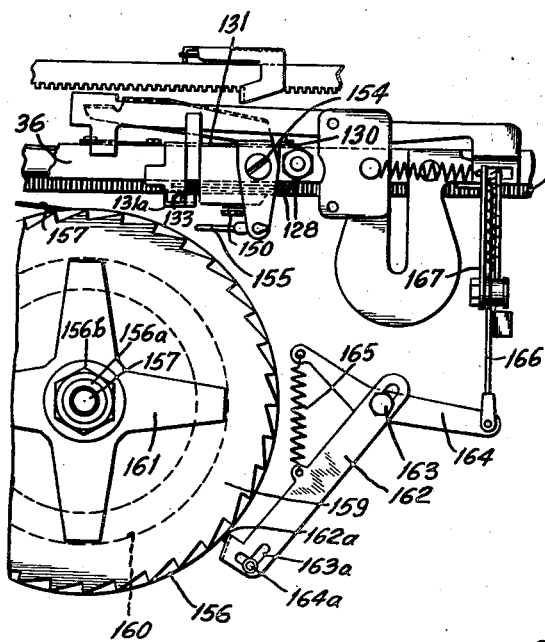
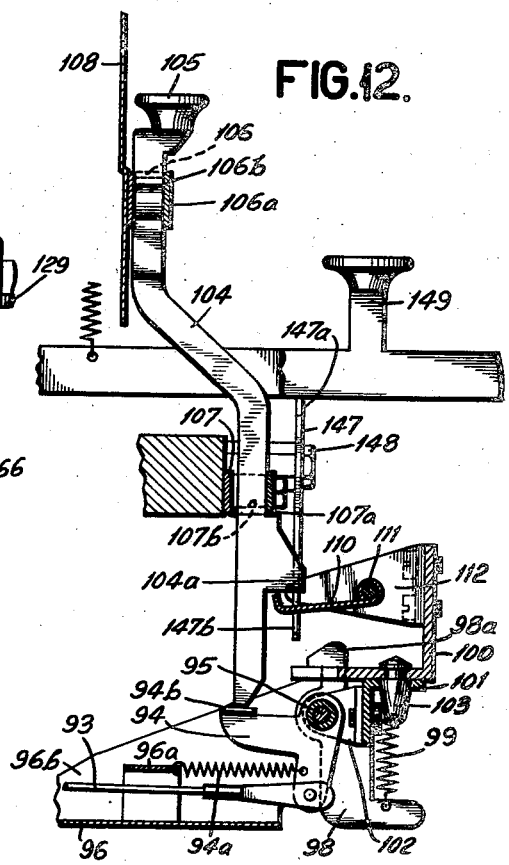
INVENTOR.
Richard Von Reppert
BY
ATTORNEY.

Patented July 4, 1944

2,353,095

UNITED STATES PATENT OFFICE 2,353,095

TYPEWRITING MACHINE

Richard Von Reppert, Rochester, N. Y., assignor to International Business Machines Corporation, New York, N. Y., a corporation of New York Application June 25, 1942, Serial No. 448,369

12 Claims. (Cl. 197—178)

This invention relates to typewriting machines.

An object of the present invention is to provide an improved denominational tabulating mechanism, or what is sometimes called a decimal tabulator.

An object is to provide a denominational tabulating mechanism which is fully operated by power under control of manipulative devices such as denominational keys.

An object is to provide denominational tabulating mechanism with means to prevent rebound irrespective of the denominational position in which the carriage may be arrested.

Another object is to provide a denominational tabulating mechanism with means to absorb the severe shocks arising from the longer tabulating movements of the carriage.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a front elevation of the keyboard with parts of the framework broken away.

Fig. 3 is a front elevation of the part of the tabulating mechanism which cooperates with the tabulator stop bar on the carriage.

Fig. 4 is a large scale vertical section on the line 4—4 in Fig. 3.

Fig. 5 is a large scale vertical section on the line 5—5 in Fig. 3.

Fig. 8 is a large scale horizontal section on the line 8—8 in Fig. 3.

Fig. 9 is a large scale vertical section on the line 9—9 of Fig. 8.

Fig. 10 is a detail plan view of the releasing means for the counter-stop carriage, showing the latter in normal position.

Fig. 11 is a view similar to Fig. 10 but showing the counter-stop carriage in released position.

Fig. 12 is a vertical section on the line 12—12 in Fig. 2.

Fig. 13 is a large scale detail view of the friction governor and trip lever for the carriage return mechanism.

Figure 1:
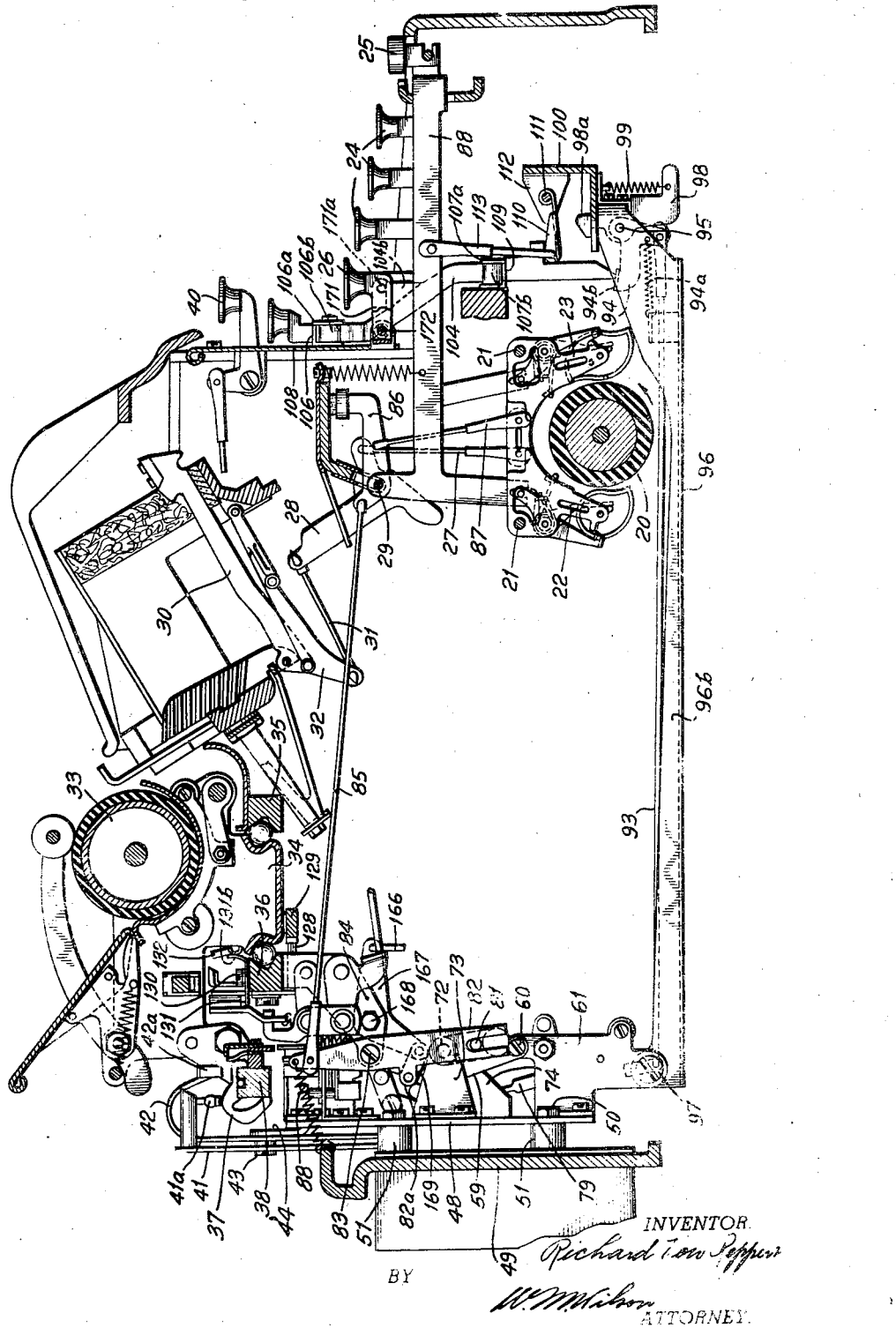
Fig. 1 is a vertical section through the machine.

The present invention has been disclosed in the drawings as applied to a power operated typewriter and, for convenience in illustration, has been shown with reference to the well known "Electromatic" typewriter, also known as the "International." It will be understood, however, that the invention may be applied to other forms of power operated typewriters or to manually operated typewriters. Since the mechanism of the "Electromatic" typewriter is now well known in the art, only a very brief general description will be given herein for convenience.

The power to operate the machine is provided by a power roller 20 (Fig. 1) which rotates continually in the direction of the arrow while the machine is in use. Pivotally mounted on cross rods 21 are cam units generally designated 22, 23 which are controlled by the character keys 24, by the space bar 25, and by the tabulating key 26. Whenever one of the character keys 24 is depressed, it controls a cam unit 23 to operatively condition the cam unit for actuation by the power roller 20 in a well known way. This causes the operative cam unit 23, (Fig. 1) to rock in a counterclockwise direction and pull down a link 27.

The links 27 are connected to sub-levers 28 pivoted on a rod 29 suitably supported in framework and rock the sub-levers 28 in a clockwise direction. Each sub-lever 28 is connected to a type bar 30 by means of a link 31 and a toggle 32 whereby the rocking of any sub-lever 28 in a clockwise direction actuates the type bar 30 in a counterclockwise direction to effect an impression upon a work sheet on the platen 33. The platen 33 is rotatably mounted in the main or platen carriage 34 which is movable on the front rail 35 and the rear rail 36.

Ordinarily, the tabulating key 26 directly controls the cam unit 22 which has a single lobed cam and is operatively connected to the tabulating mechanism to effect the operations of actuating a single counter stop into the path of column stops on the main carriage and at the same time to release the escapement mechanism.

In the present case, the tabulating key 26 indirectly controls the cam unit 22 in a manner which will be made clear hereinafter and, when rendered operative, the cam unit 22 provides power for raising a selected one of a bank of counter stops into the path of a column stop on the main carriage.

Figure 6:
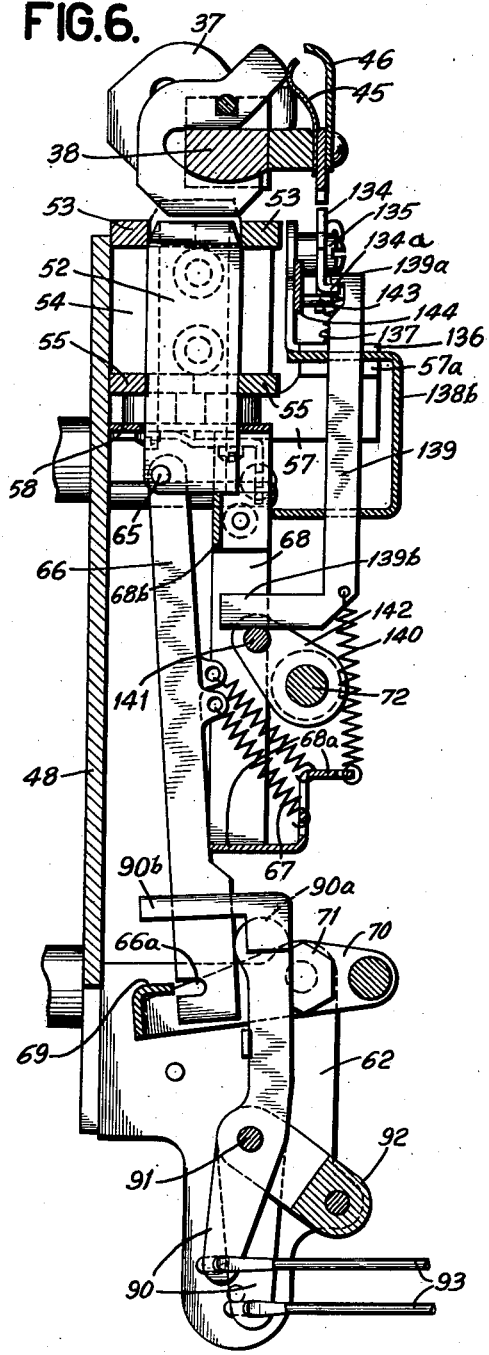
Fig. 6 is a large scale vertical section on the line 6—6 in Fig. 3.
Figure 7:
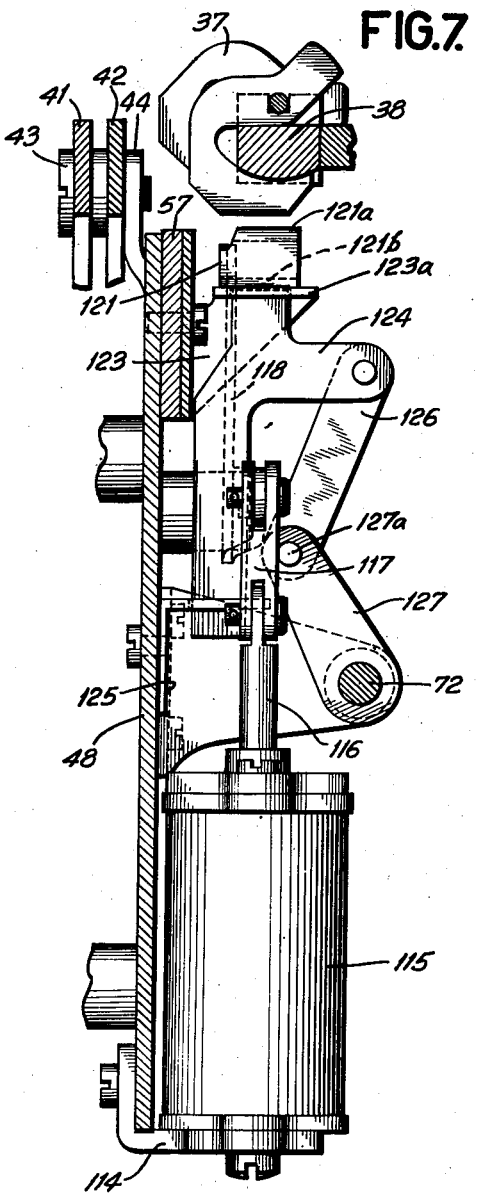
Fig. 7 is a large scale vertical section on the line 7—7 in Fig. 3.

The column stops 37 are mounted upon a stop bar 38, (Figs. 1 and 3 to 7). Conveniently the column stops 37 and stop bar 38 are constructed like the ones disclosed in Patent No. 2,157,053, but the stop bar is so arranged, as most clearly shown in Figs. 4 to 7, that the portions 37a which are engaged by the counter stops project downwardly when the stops are set to active position, instead of to the right. As in the above patent, the mechanism is provided with a special setting key 39 (Fig. 2) and a clearing key 40, which through a linkage not shown, controls a stop showing lever 41 (Fig. 1) and a clearing cam lever 42, both of these levers being pivoted on a stud 43 (see Fig. 7 also) supported by a bracket 44 carried by the framework. The setting lever 41 has a stop setting head 41a similar to the stop setting head in the above patent, which in this case projects downwardly and is moved downwardly whenever the key 39 is depressed, to rock a stop 37, such as the one in front shown in Fig. 5, in a counterclockwise direction to the position of the foremost stop 37 in Fig. 4. Figs. 1 and 5 show in front the position of an unset stop while Figs. 4, 6 and 7 show in front stops which have been set to active position.

The clearing lever 42 has a cam portion 42a in the form of a V-shaped bend providing two cam surfaces designed to engage the tail 37b (Fig. 4) of the set stop and move it downwardly to thereby restore the stop to unset position as in Fig. 5. The stops are held in set and unset positions respectively by a spring plate 45 (Figs. 4 to 6) formed with prongs or teeth engaging the tails 37b of the stops 37. The stop bar 38 is provided with a guard plate 46 which protects the spring plate 45 and with a rebound rack 47, the function of which will be made clear hereinafter.

The bulk of the denominational tabulating mechanism is mounted on a plate 48 (Figs. 1 and 3 to 11) which extends vertically parallel with the rails 35, 36 which support the main carriage 34, and is secured to the base 49 by means of the studs 50 and suitable spacers 51, as shown in Figs. 1 and 4.

The mechanism is provided with a bank of ten denominational counterstops 52 which are most clearly shown in Figs. 6, 8 and 9. These counterstops take the form of flat plates vertically slidably mounted in a box-like frame or carriage which consists of two top plates 53 secured to the top edges of vertical spacer blocks 54 and two bottom plates 55 similar to the top plates 53. The vertical front and rear edges of the counterstops 52 are beveled to fit triangular notches in plates 53, 55, whereby the counterstops may be raised vertically into the path of a set column stop 37 as indicated by the dotted line in Fig. 6. The frame comprising the plates 53, 55 and the blocks 54 forms a denominational counterstop carriage which is horizontally slidably mounted on the plate 48. For this purpose each block 54 is provided with two vertically aligned pins 56 which project horizontally to right and left (Figs. 8 and 9) through holes in brackets 57 secured to the front face of the plate 48 adjacent its upper edge as most clearly shown in Figs. 8 to 11.

Secured to the under side of the plates 55 by the same screws fastening said plates to the blocks 54, is a frame plate 58 (Figs. 3 to 9) having a projection 58a (Figs. 4 and 8) engaging the side of a latch lever 59 pivoted at 60 (Figs. 1, 3 and 4) on a bracket 61 secured to the front face of the plate 48 on its lower edge. The bracket 61, together with a similar bracket 62, supports most of the power operating mechanism for the counterstops 52, as will be made clear hereinafter.

Normally the projection 58a holds the denominational counterstop frame or carriage in its normal or left-hand position with reference to Figs. 3 and 10 by engaging the side of the lever 59. However, when the lever 59 is rocked counterclockwise (Fig. 4) an opening 59a in the upper end of the lever 59 is brought into register with the projection 58a and allows the projection to pass into said opening as in Fig. 11, thereby permitting the counterstop carriage comprising the plates 53, 55 and the blocks 54 to move approximately half a letter space of the main carriage and to the right (Figs. 3, 8, 9, 10) to the position shown in Fig. 11. Also the movement of the projection 58a into the opening 59a serves to lock the lever 59 against rotation for a purpose which will be made clear hereinafter.

In order to move the denominational counterstop carriage in the foregoing fashion, there is provided a spring 63 (Fig. 3) which is anchored to a pin carried by the plate 48 and to a bracket 64 attached to the denominational stop carriage. If any of the denominational stops 52 has been elevated, movement of the stop carriage will move the upper end of the elevated denominational counterstop nearer the particular set column stop 37 which is ultimately to engage the denominational stop to arrest the main carriage.

Pivoted at 65, as most clearly shown in Fig. 6, to each stop 52, is an operating hook or link 66 which is urged in a counterclockwise direction by means of a spring 67, there being a hook 66 and a spring 67 for each counterstop 52. The springs 67 are anchored to a U-shaped frame 68 suspended from the under side of the denominational counterstop carriage, this frame being formed with cross bars 68a to which the springs 67 are anchored. The lower end of each hook or link 66 is provided with a horizontal slot 66a, best shown in Fig. 6, located opposite the cross bar 69 of a common actuating bail including side arms 70, which bail is pivoted on studs 71 carried by the brackets 61, 62. This bail or actuator is oscillated in a clockwise direction (Figs. 4, 5, and 6) to raise the cross bar 69 by mechanism presently to be described. If any of the links or hooks 66 have been rocked in a clockwise direction to cause the slot 66a therein to embrace the cross bars 69, the oscillating movement of the bail 70 will cause the hook 66 to rise and thereby project the counterstop 52 to which it is connected upwardly into the path of a set column stop.

The oscillations of the bail 70 are effected by power furnished by the cam unit 22. A shaft 72 (Figs. 3 to 7) is journalled at its ends in bracket 73 and in a bracket 74 which brackets are secured to the front face of the plate 48. Secured on the shaft 72, to the right of the bracket 74 (Fig. 3) is an arm 75 connected by a link 76 to an arm 77 pivoted on a stud at 78 (Fig. 5) carried by the bracket 74. The arm 78 is connected by an adjustable link 79 to the left hand arm (Fig. 3) of the bail 70. Rocking of the shaft 72 in a clockwise direction (Fig. 5) will result in rocking the arm 77 and the bail 70 in the same direction on their respective studs 78 and 71.

Secured to the left hand end (Fig. 3) of shaft 72 is an arm 80 having a pin 81 (Fig. 1) projecting through a vertical slot in the lower end of a lever 82. The latter is pivoted on a stud 83 on a bracket 84 secured to the left hand end of the rear rail 36. The upper end of the lever 82 is connected by a link 85 (Fig. 1) to a bell crank 86 journalled on the rod 29 which pivotally supports the sub-levers 28. The bell crank 86 is connected by a link 87 to the cam unit 22. This cam unit is controlled by a key lever 88 similar to the key levers which control cam units 23, and when the key lever 88 is depressed, that is, rocked clockwise with reference to Fig. 1, the cam unit 22 will be operatively connected to the power roller 20 and caused to rock in a clockwise direction, thereby drawing down the link 87 and rocking lever 86 in a clockwise direction. This draws the link 85 to the right (Fig. 1), rocking the lever 82 in a clockwise direction thereby, through the pin 81 and the arm 82, rocking the shaft 72 in a clockwise direction. This movement, as explained above, will oscillate the bail 70 in a clockwise direction to elevate any denominational counter-stop 52 which may have been coupled thereto by moving the link 66 for such stop in a clockwise direction (Fig. 5).

The arm 59 is operated by the shaft 72 through a system somewhat similar to that described above for the bail 70. This system consists of a toggle arm 75a (Figs. 3 and 4) normally held by a spring 75b against a stop pin 74a carried by the bracket 74. The arm 75a is connected by a link 76a to a toggle link 77a pivoted at one end on a stud 78a carried by the bracket 74. Link 77a is pivoted at its other end to a toggle link 77b which in turn is pivoted on a stud 78b carried by the upper end of the arm 59. Normally clockwise rotation of the arm 59 is limited by a pin 74b carried by the bracket 74. When the shaft 72 is rocked clockwise by the cam unit 22, the toggle which is composed of the arm 75a and the link 76a is straightened thereby rocking the arm 77a counterclockwise to bend the toggle comprising the links 77a, 77b. This draws the upper end of the arm 59 to the left in Fig. 4, or upwardly in Fig. 10, to allow the projection 58a to enter the opening 59a as shown in Fig. 11. The parts 58a, 59 are mutually self-locking, the arm 59 locking the denominational counter-stop carriage in its left hand position and projection 58a locking the arm 59 in its operated position. Thus when the denominational counter-stop carriage moves to the position of Fig. 11 the arm 59 will be locked in rocked position and thereby lock the shaft 72 in rocked position. Since bail 70 is locked in rocked position, any raised counter-stop 52 will be locked in elevated position. When the denominational counter-stop carriage is moved back to the position of Fig. 10 the arm 59a will be released and allow spring 75b to restore the parts connected to shaft 72 to the positions shown in Figs. 4 to 7.

The movements of the links 66 to operatively couple the denominational counter-stops 52 to the operating bail 70 are effected by means of levers 90 (Figs. 1, 5, 6, and 9) pivotally mounted on a rod 91 carried by a cross bar 92 which is oval in section and supported by the brackets 61, 62. This bar 92 is slotted transversely to guide the levers 90 and space them apart. Each of the levers 90 is disposed in the plane of one of the operating hooks 66 and its upper end is rounded at 90a to provide a bearing surface against the right hand edge (Figs. 5 and 6) of the lower end of the link 66 with which it is associated, the springs 67 holding the links 66 in engagement with the rounded ends of levers 90 so as to tend to rotate said levers in a clockwise direction with reference to Fig. 6 whenever the levers 90 have been operated to engage the hooks 66 with the bail 70. Movement of the hooks or links 66 however, is limited by one of the cross bars 68a of the frame 68. A cross bar 68b, joining the sides of the frame 68 limits downward movement of the stops 52 and hooks 66 under the stimulus of the springs 67.

Each of the levers 90 is provided with at least one guide piece 90b (Figs. 3 to 6 and 9) which is secured to the side of the rounded portion 90a and projects horizontally alongside of the corresponding hook 66 to hold said hooks in alignment with their respective levers 90. There are three groups of the stops 52, of which the middle and right hand groups (Fig. 9) comprise three stops each, while the left hand group comprises four stops. There is a space between groups and the extreme right hand lever 90 for each group (Fig. 9) is provided with two of the guide pieces 90a located on both sides of the rounded portion, whereas the remaining levers 90 are only provided with guide pieces 90a on their left hand sides.

The tabulating mechanism as disclosed in the drawings is designed for an elite machine in which the characters are spaced twelve to the inch and the blank positions between the middle and outer groups of stops 52 correspond to the space which is usually allotted to the comma in writing amounts. It is common practice in writing monetary amounts to use a blank space instead of a comma between the hundreds and thousands denominational orders and between the hundred thousands and millions orders. Since in writing amounts one would never start the amount with a comma, no counter-stops 52 are provided to correspond with the blank spaces in Figs. 8 and 9. However, in cases where neither commas nor blank spaces are used to break up an amount as in scientific tabulations, the blank spaces shown in Figs. 8 and 9 could be filled with additional counter-stops 52. The extreme left hand stop (Fig. 9) corresponds to the position of the decimal point, since it is usually desired to write the decimal point.

The levers 90 are connected by links 93 (Figs. 1, 2, 3, 5 and 12) to bell cranks 94 (Figs. 1 and 12) pivoted on a rod 95 journalled in a frame 96. Bell cranks 94 are urged clockwise by springs 94a anchored to a cross bar 96a of frame 96. Frame 96 is formed of a stamped plate having upturned sides 96b pivoted by studs 97 to the brackets 61, 62 (Fig. 1) at which point the frame is narrower than at its front end, as will be observed by comparison between Figs. 2 and 3. At its front end, the frame 96 is provided with latches 98 (Figs. 2 and 12) which are urged in a counterclockwise direction (Fig. 12) by springs 99. These latches have hook shaped portions 98a which extend upwardly through slots in an angular support bar 100 and hook over the top surface of the horizontal portion of the bar, as best shown in Fig. 12, thereby holding the frame 96 up against the bar 100.

The frame 96 includes a stiffening cross bar 101 secured between the upturned sides of the frame and supporting the bracket 102 which is located near the middle of the rod 95 to provide support therefor. The horizontal flat top surface of the angle bar 101 bears against the under side of the bar 100 and the bar 101 is provided with a hole into which projects a taper pin 103 carried by the bar 100 and projecting downwardly for the purpose of aligning the levers 94 with the denominational tabulator keys.

Each of the bell cranks 94 is formed with a lug 94b (Figs. 1, 2 and 12) located opposite the stem 104 of one of the denominational keys 105 whereby, when the frame 96 is properly latched in place, each of the bell cranks 94 may be operated by the corresponding denominational key 105. The upper ends and mid-portions of the keys 104 are guided by two channel strips 106, 107 secured to a front frame plate 108 and are transversely slotted to form guide combs for the stems 104. Cover strips 106a, 107a secured to the angle strips 106, 107 and spaced from the strips by means of bushings 106b, 107b keep the stems 104 from moving forwardly out of the slots in the angle strips.

Each stem 104 is provided with offset 104a which overlies a bail 110 (Figs. 1, 2 and 12) in the form of a bar pivoted by a rod 111 to brackets 112 carried by the angle strip 106. As shown in Figs. 1 and 2, the bail 110 is connected by a link 113 to the key lever 88. Whenever any key 104 is depressed, the offset portion 104a, in moving downwardly, will rock the bail 110 counterclockwise (Figs. 1 and 12) thereby drawing down the link 113 and operating the key 88. This, as was made clear above, will cause an operation of the cam unit 22 to operate the tabulating mechanism to elevate a stop 52.

The denominational values of the keys 105 are denoted in Fig. 2 by the symbols above the keys. The extreme left hand key 105 selects the extreme left hand stop 52 in Fig. 9 for elevation by the actuator or bail 70 and corresponds to the decimal printing position of an amount involving dollars and cents or a decimal. The next adjacent keys in the order named are the units, tens, hundreds, thousands, ten-thousands, hundred-thousands, millions, ten-millions, and hundred-millions keys which select stops 52 which will cause the carriage to be stopped in the proper position to print the desired first digit of an amount in dollars and cents. For example, if an amount involving several thousand dollars but less than ten is to be printed, the T key 105 in Fig. 2 will be depressed and its stop 52 will cause the carriage to be arrested in the proper position to print the numeral denoting the number of thousands of the amount.

In order to absorb shocks arising from long runs of the carriage there is provided an automatically disengaging shock absorbing device in the form of a dash-pot which is rendered operative for actuation by the stop which is to determine the final stopping position of the main carriage. This device is arranged so that it is not effective for short tabulating movements. On short tabulating runs there not only is relatively little time to build up a pressure in a dash-pot, but the main carriage would not acquire sufficient momentum to carry it to its final stopping position. Also it has been found that on short tabulating movements the main carriage has a tendency to move rather sluggishly when subjected to the action of a retarding device. On long tabulating movements, the main carriage builds up considerable velocity and the inertia is so great that the stopping of the carriage too abruptly has a tendency to cause the main carriage to rebound and shocks arising from sudden termination of the movement of the carriage unduly strain the operative column stop and counter-stop.

The shock absorbing device is shown at the right in Fig. 3 and in Fig. 7. Portions also appear in Fig. 8. Secured to the lower edge of the plate 48, near its lower right hand corner (Fig. 3) is a bracket 114 on which is mounted a dash-pot 115 having the usual piston to which is attached the piston rod 116. The piston rod is connected by a short link 117 to the horizontal arm of a bell crank 118 pivoted on a stud 119 carried by the plate 48. This bell crank is urged in a clockwise direction (Fig. 3) to the upper limit of travel of the piston by a spring 120 which is anchored to the vertical arm of the bell crank and to a pin carried by an extension 48a of the plate 48. Pivoted at 118a on the vertical arm of bell crank 118 is a dash-pot operating member or link 121 which is urged in a counterclockwise direction by a spring 122. The left hand end of member 121 as most clearly shown in Figs. 3 and 8 is provided with an angular offset portion comprising an upstanding lug 121a and a horizontal lug 121b of which the lug 121a is bevelled while the lug 121b rests on the top surface of a lug 123a formed in a bracket 123 secured to the plate 48 by the same screws as fasten the bracket 57 to said plate. The lug 123a has a slot which serves to guide the upper end of a slide 124, the lower end of which is guided in a slot in a bracket 125 secured to the front face of the plate 48. The slide 124 has a forwardly projecting portion to which is pivoted a toggle link 126. The lower end of the toggle link is pivoted at 127a to a toggle link in the form of an arm 127 secured to the shaft 72.

When the shaft 72 is rocked clockwise as described above by the cam unit 22, the toggle comprising the arm 127 and link 126 is straightened, thereby raising the slide 124 and lifting the left hand end (Fig. 3) of the member 121. This movement places the bevelled lug 121a in the path of the nearest set column stop 37 to the right (Fig. 3). With movement of the main carriage to the left, with reference to Fig. 3, the set column stop will engage the lug 121a and draw the member 121 to the left, the upper end of the slide 124 supporting the member 121 until the carriage has moved far enough for the lug 121b to ride off of the upper end of the slide 124. When this happens, the spring 122 will draw the member 121 downwardly until the lug 121b again rests on the top surface of the lug 123a and the slide 124 will then hold the member 121 in its leftward position. This movement of the member 121 to the left causes the dash-pot operating lever 118 to be rocked counterclockwise (Fig. 3) against the tension of the spring 120 and will actuate the dash-pot 115 to retard the movement of the carriage an extent depending upon the adjustment of the dash-pot 115 which may be provided with the usual valve to regulate the compressive effect of the air in the lower chamber of the dash-pot. It will thus be seen that the dash-pot is not continuously operated by the carriage but is effective only for a predetermined length of time and does not absorb enough of the momentum of the main carriage to prevent the carriage from coasting far enough to bring the set column stop into cooperation with the operative counterstop.

In the case of a very short tabulating movement being required, the set column stop which determines the final position of the carriage will have a position to the left of the lug 121a and will not operate the member 121 which in this case will merely rest idly. It may happen, if the next set column stop to the right of the operative stop (Fig. 3) is close to the operative stop, that the second stop will engage the lug 121a and wholly or partially operate the dash-pot. This will have little effect as it is a short run in any case.

It will be remembered that the movement of the counter-stop carriage to the right with reference to Figs. 3, 8 and 9 permitted by the movement of the arm 59 also results in locking the arm 59 in the position of Fig. 11. This, of course, holds the shaft 72 in its rocked position and thereby, through the toggle 126, 127 holds the member 121 in elevated position until the member is moved by the carriage, as described above, to the released position with the lug 121b at the left of the slide 124. Thus, the initial movement of the counter-stop carriage to the right also effects the locking of the dash-pot operating mechanism in the operative position. In other words, the elevation of a counter-stop into a position to cooperate with a set column stop also results in the elevation of the operating member 121 and the locking of such member and column stop in the elevated position prior to any movement of the carriage, and it requires a movement of the main carriage to the left to restore the counter-stop carriage, the counterstop, and the dash-pot operating lever 121 to their normal positions shown in the drawings.

Before restoration of the counter-stop carriage and dash-pot operating member 121 can take place the main carriage must move freely to the desired denominational stopping position determined by the set counter-stop, and in order to permit this the escapement pawls must be released. The escapement pawls are designated 128 in Figs. 1, 4, 8 and 13, and cooperate with the usual escapement rack 129 secured to the under side of the main carriage 34. Pivoted at 130 (Figs. 1, 4, 8 and 13) on the rear rail 36 is an escapement release lever 131 which has a downwardly, forwardly, and upwardly recurving lug 131a which projects through the planes of the pawls 128 as most clearly shown in Fig. 8. This lever also has a lug 131b which cooperates with a bail 132 pivoted on the main carriage and operated by the usual carriage release levers (not shown). When the bail 132 is rocked clockwise (Fig. 1) by the main carriage release levers, the lever 131 is rocked counterclockwise with reference to Fig. 8 causing the lug 131a to travel upwardly in Fig. 8 or to the left in Fig. 4 thereby disengaging the escapement pawls 128 from the rack 129. The arm 59 is formed with an upstanding lug 59b (Figs. 4 and 8) which projects upwardly between the sides of a U-shaped bracket 133 secured to the lever 131. When the arm 59 is rocked counterclockwise (Fig. 4) by the oscillation of shaft 72 produced by the cam unit 22, as described above, the lug 59b travels to the left in Fig. 4, or upwardly in Fig. 8 and disengages the escapement pawls 128 from the rack 129. Owing to the locking of the arm 59 by the projection 58a, the pawls 128 will be held disengaged until the counter-stop carriage has been moved to the left (Figs. 3 and 8) to disengage the arm 59 and permit the shaft 72 to rock back to its starting position.

In order to prevent rebound when the main carriage is finally stopped by the counter-stop carriage reaching its normal left hand position (Figs. 3 and 8) there is provided a rebound dog which is brought into action by the oscillation of shaft 72 and the movement of the denominational carriage. The rebound dog is designated 134 (Figs. 3 to 6 and 8) and is pivoted by a stud 135 to a bracket 136 supported by bent-over lugs 57a formed in the brackets 57. The dog 134 is urged in a clockwise direction (Fig. 3) by a spring 137 and is formed with a lug 134a extending forwardly and horizontally at right angles to the body of the dog. Mounted on the lugs 57a, between the bracket 136 and said lugs, is a guide plate 138 which, among other things, is provided with a slot to guide the end of the arm 59b and also has a downward extension 138b. The bracket 136, the plate 138, and the extension 138b of such plate, have vertically aligned slots guiding a slide 139, the upper end of which is notched to provide a hook 139a (Fig. 6) overlying the lug 134a. A spring 140, anchored to the slide 139 and to the cross bar 68a tends to draw the slide 139 downwardly as most clearly shown in Fig. 6.

The slide 139 has a horizontal and rearwardly extending lug 139b which rests upon a pin 141 carried by an arm 142 fixed to the shaft 72. When the shaft 72 is oscillated in a clockwise direction with reference to Fig. 6 as described above, the pin 141 rises and lifts the slide 139. This permits the dog 134 to be rocked clockwise (Fig. 3) by its spring 137 until it is stopped by engagement of a tail 134b in the dog 134 with a stop pin 143. The pin 143 is mounted on a slide 144 which is horizontally movable on studs 145 carried by the bracket 136. This slide 144, for practical purposes, may be considered as part of the counter-stop carriage because of the fact that the slide is formed with a slotted lug 144a (Fig. 8) which fits in a groove in the head of a stud 146 screwed into the left hand block 54 (Fig. 8). By turning the stud 146, the relation of the slide 144 to the counter-stop carriage may be adjusted and thereby the position of the pin 143 in relation to the tail 134a may be regulated.

Adjustment and timing of the parts is such that the counter-stop carriage is not released for movement to the right hand (Figs. 3 and 8) until the shaft 72 has practically reached the end of the oscillation effected by the cam 22. During this movement of the shaft, however, the slide 139 is raised permitting the rebound dog 134 to rock clockwise until the tail 134a strikes the pin 143. This engagement of the tail with the pin will occur at about the time the counter-stop carriage is released with the result that the pin 143 will move to the right in Fig. 3 and rock the dog 134 counterclockwise back to the position of Fig. 3 and will hold it in this position while the main carriage is moved to bring the set column stop into engagement with the set counter-stop.

When the counter-stop carriage is moved back to the position of Figs. 3 and 8 by the column stop, the pin 143 will be moved back to the position of Fig. 3 thereby allowing the dog 134 again to rock clockwise. This movement will cause the end of the dog to engage the rebound rack 47 at about the time when the final stoppage of the carriage occurs, with the result that the main carriage will be trapped and prevented from rebounding during the critical period. The actual release of the arm 59 which will permit the restoration of the rebound dog 134, and other parts which have been locked in position by such arm will not occur until the counter-stop carriage has been virtually fully restored. It will be understood, of course, that the inertia of the shaft 72 and other parts connected thereto will prevent restoration of the dog 134 before the main carriage has come to rest. In other words, the counter-stop carriage may be moved back the full extent to the home position and positively stopped before the actual restoration of the shaft 72 and other parts connected thereto or actuated thereby takes place. It will be evident that the restoring movement of the counter-stop carriage will take place in a very small fraction of a second which is insufficient to even allow the shaft 72 to get started back to its normal position because of the very short travel of the denominational counter-stop carriage.

It is desirable to provide interlocks to prevent simultaneous operation of both the tabulating mechanism and the carriage return mechanism, as it is quite possible that the operator might accidentally operate both a tabulating key and a carriage return key. One of these interlocks comprises a lever 147 (Figs. 2 and 12) pivoted on a stud 148 carried by the framework. This lever has a lug 147a which projects upwardly directly underneath the carriage return key 149 and has a hook-shaped portion 147b located slightly below the bail 110 which it will be recalled, operates the key lever 88 controlling the cam unit 22. When the bail 110 is depressed by any tabulating key 105, the bail moves downwardly far enough to block movement of the lever 147 in a clockwise direction (Fig. 2) and thereby prevents depression of the carriage return key 149. On the other hand, when the carriage return key 149 is depressed the hook-shaped portion 147b moves underneath the bail 110 and prevents depression of a tabulating key 105.

It is possible that the counter-stop carriage might be locked in the position of Fig. 11, with a stop 52 in elevated position, when the carriage return key is operated. If this happens, the carriage will move in the opposite direction to that which it moves during a tabulating movement with the result that one of the set column stops will strike the said stop 52 and try to move the counter-stop carriage further to the right of its released position which, of course, would be impossible. As a result the counter-stop or the column stop probably would be broken because these parts are usually heat-treated and, even if they were not, they would be likely to be bent to such an extent as to impair the accuracy of the tabulating mechanism. It is also possible that the carriage return tape might become broken. In order to prevent this, means are provided to automatically unlatch the arm 59 by moving the counter-stop carriage to the left, back to normal position before the main carriage can move. For this purpose, there is provided a release lever 150 (Figs. 4, 8 and 13) pivoted on a stud 151 carried by a bracket 152 secured to the front face of the plate 48. The rear end of the lever 150 extends to the right of a pin 58b on the plate 58, while the forward end of the lever extends into the plane of the carriage return clutch trip lever 153. This lever (Fig. 13) is pivoted at 154 on the rear rail 36 and is rocked clockwise when a carriage return operation is initiated by depressing the carriage return key 149.

The carriage return mechanism may be substantially the same as the one described in Patent No. 2,157,053. It will suffice to state here that, when the carriage return key 149 is depressed, a cam unit similar to the cam unit 22 is rendered operative to engage the carriage return clutch and at the same time rock the trip lever 153 (Fig. 13) clockwise through the medium of a link 155. This movement causes the lever 150 to be rocked counterclockwise (Fig. 8) thereby forcing the counter-stop carriage to the left in Fig. 8 to release the arm 59. This will permit restoration of the tabulating mechanism to normal position and this will take place before the carriage has moved at all or, at the most, any appreciable distance, because of the fact that there is some slippage in the carriage return clutch and the cam unit which operates the clutch has such a fast action that it completes its operation of the lever 153 before the carriage actually moves.

Additional control of the movement of the main carriage is provided by the usual carriage friction brake which coacts with dash-pot 115 to prevent the main carriage from attaining an excessive velocity, particularly on long runs. In Fig. 13 the numeral 156 designates the usual carriage spring motor which is connected by a tape 157 to the main carriage 34 for moving the carriage in a letter spacing direction. The rotating parts of the spring motor are loosely mounted upon a stud 157 carried by the framework of the machine. A bushing 156a, which is fixed to that part of the spring motor to which the tape 157 is connected, is threaded to receive lock nuts like 156b. Rotatably mounted on the bushing 156a is a ratchet 159 between which and the spring motor 156 is a friction washer 160 made of a material having high frictional qualities like automobile brake lining. Interposed between the nuts 156b and the ratchet 157 is a friction spring 161 having four prongs spaced equal distances apart which press the ratchet 159 and the friction washer 160 toward the spring motor 156. By adjusting the nuts 156b on the bushing 156a pressure of the friction washer 160 on the spring motor 156 may be regulated to the desired degree. During letter spacing movement of the main carriage the assembly comprising the spring motor 156, the ratchet 159, the friction washer 160, and the friction spring 161 rotates as a unit on the stud 157. However, if the ratchet 159 is held against movement, the motive power furnished by the spring will be reduced by the friction braking effort, thereby preventing the main carriage from accelerating too rapidly.

For the purpose of holding the ratchet immovable during the tabulating movement of the main carriage, there is provided a detent 162 which is slotted at one end to slide on a stud 163 carried by the framework while the other end has an L-shaped slot 163a receiving a pin 164a on one arm of a three-armed lever 164 which is pivoted on the stud 163. The detent 162 has a bent-over lug or tooth 162a designed to enter a tooth space in the ratchet 159 when the detent 162 is rocked clockwise (Fig. 13). Normally the spring 165, anchored to the detent 162 and to another of the arms of the lever 164, holds the detent 162 upwardly in the position of Fig. 13 with the pin 164a in the apex of the slot 163a.

One of the arms of the lever 164 is connected by a link 166 to one arm of the lever 167 (Figs. 1 and 3) pivoted on a stud 168 carried by the bracket 84. The other arm of the lever 167 is connected by a link 169 to a lug 82a formed in lever 82 which, it will be recalled, is rocked clockwise (Fig. 1) whenever the cam unit 22 actuates the tabulating mechanism. It is apparent that the lever 167 will be rocked clockwise (Fig. 1) every time a tabulating operation takes place, causing the link 166 to be thrust downwardly (Fig. 13) thereby rocking the lever 164 clockwise. This causes the lug 162a to enter a tooth space in the ratchet 159 to hold the latter against rotation. The length of the slots in the upper end of the detent 162 and the portion of the slot 163a which is in line therewith is such that the ratchet 159 is allowed to turn a tooth space or two before it is finally stopped by the pin 164a and the stud 163 striking the upper ends of the slots in detent 162. This allows a few letter spaces of movement of the main carriage before any braking effect is exerted and takes care of extremely short tabulating movement where it is not desired to have the main carriage retarded to any extent.

On a short run the main carriage does not ordinarily operate very rapidly and to stop it by a braking force under these conditions would make the short tabulating movements too sluggish. The last motion of the detent 162 also allows the main carriage to acquire a little velocity unhampered and to some degree helps to make the longer runs a little faster without permitting too great an acceleration of the main carriage.

Owing to the fact that the coefficient of kinetic friction is lower than the coefficient of static friction and decreases with the increase in the relative velocity between the parts in friction, the braking effect tends to diminish somewhat as the carriage increases in speed. Thus, while the friction brake described herein materially assists in reducing shock by reducing the speed of the carriage, it is not fully effective. The dash-pot 115 comes into action and is released a predetermined time before the carriage stop finally strikes the counter-stop 52 and exerts a short additional checking force upon the carriage before being released. Then the carriage is permitted to move a further distance subject only to the retarding force exerted by the friction brake. The dash-pot has the opposite characteristic of increasing its retarding force with velocity and is relatively ineffective at the lower velocity resulting from short runs of the carriage. On account of the fact that the brake disclosed in Fig. 13 is operating more nearly under the conditions of static than kinetic friction and also operating under the maximum kinetic friction the carriage brake is more efficient at the lower speeds of the carriage than at the higher speeds of the long tabulating runs. Thus the brake prevents initially a too rapid acceleration of the carriage while the dash-pot does not interfere with rapid acceleration of the main carriage in short runs but does considerably reduce the velocity of the carriage on the longer runs only near the end of the run.

It may be desired to use a tabulating mechanism as a simple columnar tabulator as in writing indented material which may require several indentations. For this purpose the tabulating key 26, instead of being mounted on a key lever like the other keys 24, is mounted on one arm of a U-shaped frame 171 (Figs. 1 and 2) pivoted on studs 172 passing through lugs 108a formed in the plate 108 and threaded to holes in the frame 171. The other arm of the frame 171 has a pin 171a which overlies a projection 104b formed in the decimal point tabulating key 105. Thus, when the tabulating key 26 is depressed, the decimal point tabulating key 105 will also be depressed and will cause the elevation of the extreme left hand stop 52 (Fig. 9). This stop 52 is located a little to the right of the stop setting head 41a so that when the carriage is stopped by the stop 52 for the decimal point position, as determined by any of the set column stops 37, the set column stop and the escapement pawls 128 are released and the main carriage will move about half a letter space to the left of the decimal counter-stop 52. This makes it possible to set a column stop to correspond to the first letter space of an indented column by merely moving the carriage to the desired position and pressing the stop setting key 39.

While there have been shown and described and pointed out the fundamental novel features of the invention as applied to a single embodiment it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine of the class described, a main carriage, a column stop moved by the main carriage, a counter stop carrier movable from a normal position to an advanced position in a direction counter to a letter spacing movement of the main carriage, a series of denominational stops mounted in said carrier for movement to intercept said column stop; a series of denominational keys, each associated with one of said denominational stops; actuating means controlled by the keys for selectively moving the counter stops to intercept the column stop, and means releasable by the actuating means for retaining the carrier in normal position, said releasable means including means operative, when the carrier is in the advanced position to hold the selectively moved counter-stop in intercepting position and releasable by movement of the carrier back to normal position when the column stop is intercepted by the selectively moved counter-stop.

2. In a machine of the class described, a main frame, a platen carriage mounted on the main frame, column stops on the carriage, a counter-stop carriage mounted on the main frame for movement counter to the letter-spacing movement of the carriage, counter-stops mounted on the counter-stop carriage for movement into the path of the column stops on the carriage; means to move the second carriage counter to letter spacing movement of the main carriage to an advanced position, said second carriage when moved to the advanced position with one of said counter-stops in the path of a column stop being restored by movement of the carriage in a letter spacing direction; a series of denominational keys, each associated with one of said stops; means controlled by said keys for moving the counter-stops into the path of the column stops, means controlled by said keys for rendering the moving means for the counter-stop carriage effective to move said counter-stop carriage to the advanced position, and means releasable by movement of the counter-stop carriage back to the normal position for releasing the counter-stop.

3. In a machine of the class described, a main frame, a carriage mounted in the main frame for letter spacing movement, letter spacing mechanism for the carriage, column stops on said carriage, a supplemental carriage movable from a normal position to an advanced position in a direction counter to letter spacing movement of the carriage, denominational stops mounted on said supplemental carriage for movement into the path of the column stops, means to move the supplemental carriage to the advanced position; means to render the moving means operative and lock any moved denominational stop in its moved position, said locking means being releasable by a movement of the supplemental carriage back to its normal position effected by engagement of a column stop with the moved counter-stop; a series of denominational keys, and means controlled by said denominational keys for moving said counter-stops and rendering the supplemental carriage moving and locking means effective.

4. In a tabulating mechanism, a column stop, a carrier movable toward said column stop, a series of denominational counter-stops mounted in said carrier for movement into a position to intercept the column stops, normally restrained means for moving said carrier toward the counter-stop and rendered effective by the movement of a selected counter-stop to intercept the column stop, and means rendered effective by the movement of the carrier toward the column stop for locking the selected counter-stop in intercepting position, said locking means being released upon interception of the column stop by the selected counter-stop through a restoring movement of said carrier effected by the coaction between the column stop and the selected counter-stop.

5. In a tabulating mechanism, a column stop carriage and a counter-stop carriage movable in parallel paths, a column stop on said first carriage, counter-stops mounted on the second carriage for movement to a position to intercept the column stop, means to selectively move the counter-stops to intercepting position, means rendered effective to move the second carriage toward the column stop when a counter-stop is moved to intercepting position, and means to lock the counter-stops in the intercepting position releasable by a restoring movement of the second carriage effected by the engagement of the column stop with the selected counter-stop.

6. In a machine of the class described, a main carriage, a supplemental carriage, a column stop moved by the main carriage, a series of denominational counter-stops mounted on the supplemental carriage for movement to positions to intercept the column stop, power actuating means controlled by said keys for selectively moving the counter-stops to column-stop intercepting position, and means to retain the power actuating means in actuated position so as to hold the selected counter-stop in column stop intercepting position, said retaining means being releasable by movement of the supplemental carriage effected by the engagement of the column stop and selected counter-stop.

7. In a machine of the class described, a main carriage, a column stop moved by the main carriage, a counter-stop carrier movable from a normal position to an advanced position in a direction counter to letter spacing movement of the main carriage, a series of denominational counter-stops mounted in said carrier for movement to intercept said column stop; a series of denominational keys, each associated with one of said counter-stops; actuating means controlled by the keys for selectively moving the counter-stops to intercept the column stop; and means alternatively effective to hold the carrier in normal position and to hold the selectively moved counter-stop in column stop intercepting position when the carrier is in the advanced position, including an element actuated by the carrier and a coacting element actuated by the stop moving means, the first element having a latching relation to the second element when the carrier is in advanced position released by movement of the carrier back to normal position effected by the engagement of the column stop with the selectively moved counter-stop, the second element having a latching relationship with the first element to hold the carrier in normal position, said second element, when operated by the actuating means, releasing the first element to enable said carrier to move to advanced position.

8. In a machine of the class described, a main carriage, a column stop moved by the main carriage, a counter-stop carrier movable from a normal position to an advanced position in a direction opposite letter spacing movement of the main carriage, a series of denominational counter-stops mounted in said carrier for movement to intercept said column stop; a series of denominational keys, each associated with one of said denominational stops; actuating means controlled by the keys for selectively moving the counter stops to intercept the column stop; and means for controlling the movement of said carrier to advanced position and for holding said selectively moved stop in the intercepting position, said means including two mutually coactive elements having an interlocking relation with each other whereby, when one is operated or restored, the other is rendered ineffective or effective, respectively, one of said elements being operated by the actuating means and the other by the carrier through a restoring movement thereof effected by engagement of the column stop with the selectively moved counter-stop.

9. In a machine of the class described in combination with a carriage, a row of column stops for determining different columnar positions of the carriage, a row of denominational counter-stops for determining denominational positions of the carriage in each column by cooperation with said column stops, a carriage for the counter-stops; a series of denominational keys, each corresponding to a counter-stop; power means for moving the counter-stops into the path of the column stops controlled by said keys, and means controlled by said power means for moving said counter-stop carriage from a normal position to an advanced position from which said counter-stop carriage is restored by movement imparted thereto by the engagement of a column stop with a counter-stop.

10. In a machine of the class described, in combination with the main carriage, a row of column stops for defining different columnar positions of the carriage, a row of counter-stops for defining different denominational positions of the main carriage in conjunction with each column stop; a supplemental carriage movable from a normal position to an advanced position in the line of travel of a column stop so as to be engageable thereby, in the course of movement of the main carriage, to push said supplemental carriage back to the normal position; means to move said supplemental carriage; a series of denominational keys, each associated with one of said counter-stops for controlling said moving means and for controlling the movement of the column stop into the path of a counter-stop, a rebound rack movable by the main carriage, a rebound check, means tending to move the rebound check into cooperation with the teeth of the rebound rack, means releasable under control of said keys for enabling the rebound check to move into engagement with the rebound rack, and further means controlled by the supplemental carriage for releasing the rebound check.

11. In a machine of the class described, in combination with the main carriage, a row of column stops for defining different columnar positions of the main carriage; a row of counter-stops, each for defining a different denominational position of the main carriage with respect to each column defined by a column stop; a supplemental carriage for the counter-stops movable from a normal retracted position to an advanced position in a direction counter to letter spacing and tabulating movement of the column stops, said supplemental carriage being retracted by movement imparted thereto by a column stop engaging one of said counter-stops; means controlled by the position of said carriage for locking the counter-stops in the path of the column stops, denominational keys one for each counter-stop, means controlled by said keys for moving the counter-stops into the path of the column stop, means controlled by said keys for moving said carriage and to render the locking means operative, carriage return initiating means, and means controlled by said initiating means for restoring the carriage from the advanced position to the normal positoin to thereby release said locking means.

12. In combination, a main carriage, a column stop moved by the main carriage, a rebound rack moved by the main carriage, denominational counter-stops; a counter-stop carrier having means to mount said counter-stops for movement to intercept the column stop in its movement, said carrier being mounted for movement by the column stop through engagement of the latter with a selected one of the counter-stops; means to selectively move the counter-stops into intercepting position, and a rebound check released by the operation of the settable means and movable into engagement with the rebound rack by movement of said carrier.

RICHARD VON REPPERT.